(12) United States Patent
Ross et al.

(10) Patent No.: US 7,840,581 B2
(45) Date of Patent: Nov. 23, 2010

(54) METHOD AND SYSTEM FOR IMPROVING THE QUALITY OF DEEP METADATA ASSOCIATED WITH MEDIA CONTENT

(75) Inventors: Alexander Ross, Hamburg (DE); Björn Steffens, Hamburg (DE); Norman Friedenberger, Berlin (DE); Andreas Spechtler, Grödig (AT)

(73) Assignee: RealNetworks, Inc., Seattle, WA (US)

( * ) Notice: Subject to any disclaimer, the term of this patent is extended or adjusted under 35 U.S.C. 154(b) by 392 days.

(21) Appl. No.: 12/024,567

(22) Filed: Feb. 1, 2008

(65) Prior Publication Data

US 2009/0198700 A1    Aug. 6, 2009

(51) Int. Cl.
    *G06F 17/30* (2006.01)
(52) U.S. Cl. .................. 707/758; 707/761; 707/766; 707/780
(58) Field of Classification Search ............. 707/758
    See application file for complete search history.

(56) References Cited

U.S. PATENT DOCUMENTS

| | | | | |
|---|---|---|---|---|
| 5,616,876 | A * | 4/1997 | Cluts | ............................ 84/609 |
| 7,644,077 | B2 * | 1/2010 | Picker et al. | .................... 705/2 |
| 2001/0029522 | A1 * | 10/2001 | Yoshimine et al. | .......... 709/203 |
| 2002/0099737 | A1 | 7/2002 | Porter et al. | |
| 2002/0103920 | A1 * | 8/2002 | Berkun et al. | ............... 709/231 |
| 2005/0021420 | A1 * | 1/2005 | Michelitsch et al. | .......... 705/26 |
| 2005/0108631 | A1 | 5/2005 | Amorin et al. | |
| 2006/0004814 | A1 * | 1/2006 | Lawrence et al. | ............ 707/101 |
| 2006/0072354 | A1 * | 4/2006 | Ohnuma et al. | ............. 365/145 |
| 2006/0173872 | A1 * | 8/2006 | Koike et al. | ................... 707/100 |
| 2006/0195516 | A1 * | 8/2006 | Beaupre | ..................... 709/203 |
| 2007/0237136 | A1 * | 10/2007 | Sako et al. | .................... 370/368 |
| 2007/0276733 | A1 * | 11/2007 | Geshwind et al. | ............. 705/14 |
| 2008/0021851 | A1 * | 1/2008 | Alcalde et al. | ................. 706/21 |
| 2010/0010877 | A1 * | 1/2010 | Hunt et al. | ..................... 705/10 |

* cited by examiner

*Primary Examiner*—Don Wong
*Assistant Examiner*—Binh V Ho
(74) *Attorney, Agent, or Firm*—Kory D. Christensen; Stoel Rives LLP

(57) ABSTRACT

Methods and systems verify and control the quality of metadata associated with a media data file. The metadata may be used, for example, by media content recommendation systems. In one embodiment, a first attribute is selected from metadata associated with a media data file and an attribute dependency corresponding to the first attribute is determined. The metadata may be searched to determine whether it includes a second attribute that satisfies the dependency. If the dependency is not satisfied, the metadata is flagged for reevaluation. The metadata may also be flagged for reevaluation, for example, if the metadata includes inconsistent attributes, if the total number of assigned attributes within the metadata does not exceed a predetermined value, or if an expected attribute dimension is missing or does not include an expected number of defined attributes. In certain embodiments, user selections are controlled to provide consistent attribute combinations.

16 Claims, 8 Drawing Sheets

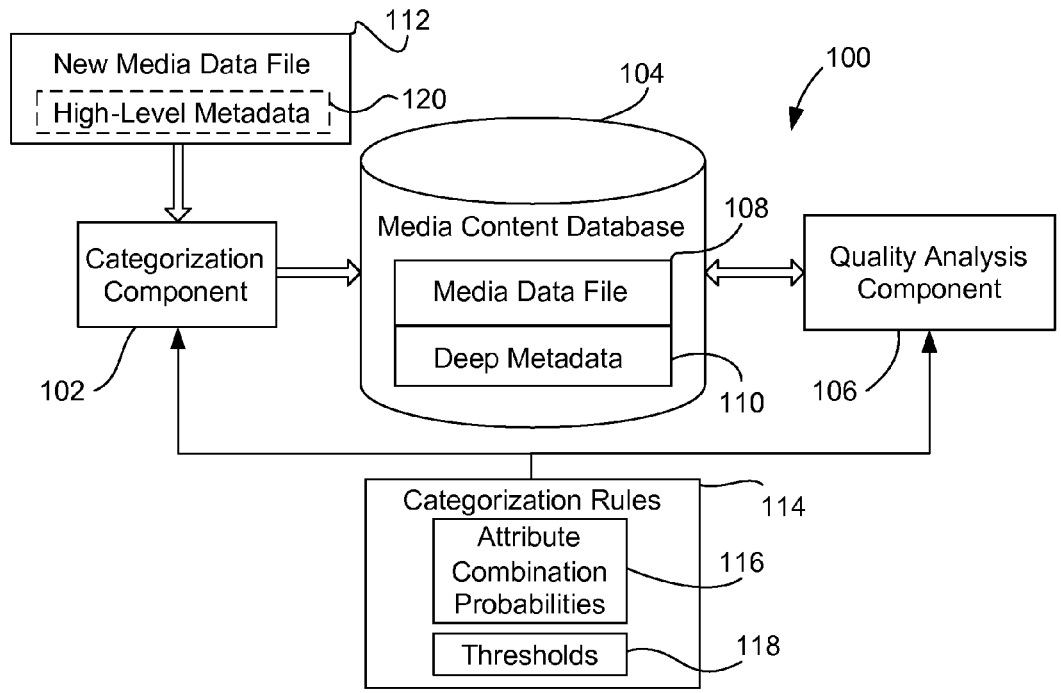
FIG. 1
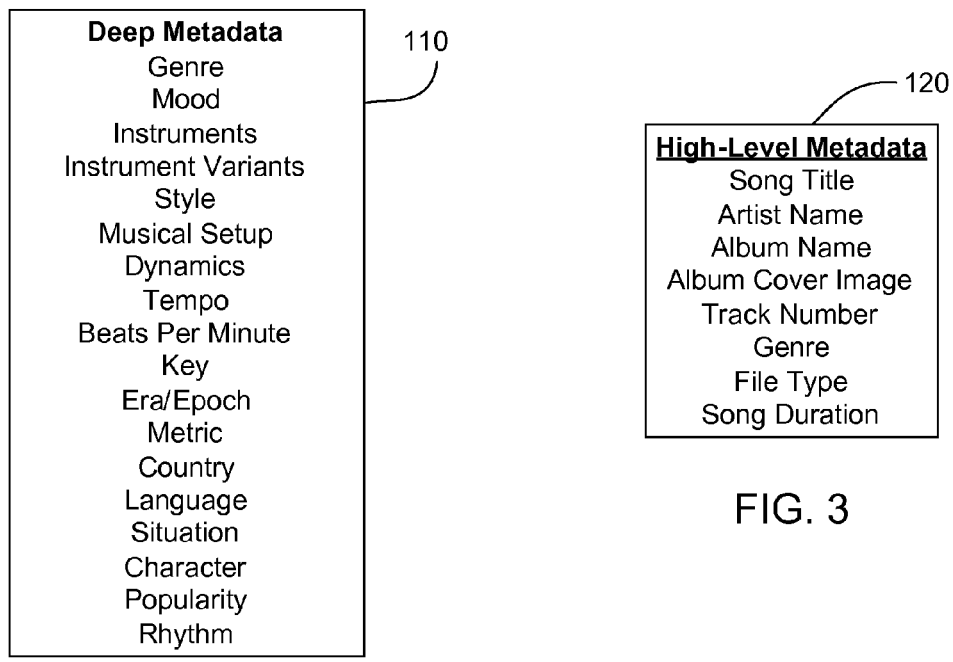
FIG. 2
FIG. 3

METHOD AND SYSTEM FOR IMPROVING THE QUALITY OF DEEP METADATA ASSOCIATED WITH MEDIA CONTENT

TECHNICAL FIELD

This disclosure relates generally to media content recommendation systems and, more particularly, to automatically analyzing relationships between attributes associated with media content accessible by media content recommendation systems.

BRIEF DESCRIPTION OF THE DRAWINGS

Non-limiting and non-exhaustive embodiments of the disclosure are described, including various embodiments of the disclosure with reference to the figures, in which:

FIG. 1 is a block diagram of a system for accurately categorizing and verifying deep meta data associated with media content according to one embodiment;

FIG. 2 graphically illustrates an example deep metadata data structure corresponding to an audio data file according to one embodiment;

FIG. 3 graphically illustrates an example high-level metadata data structure that may be initially included in the new media data file according to one embodiment;

DETAILED DESCRIPTION

Figure 4:
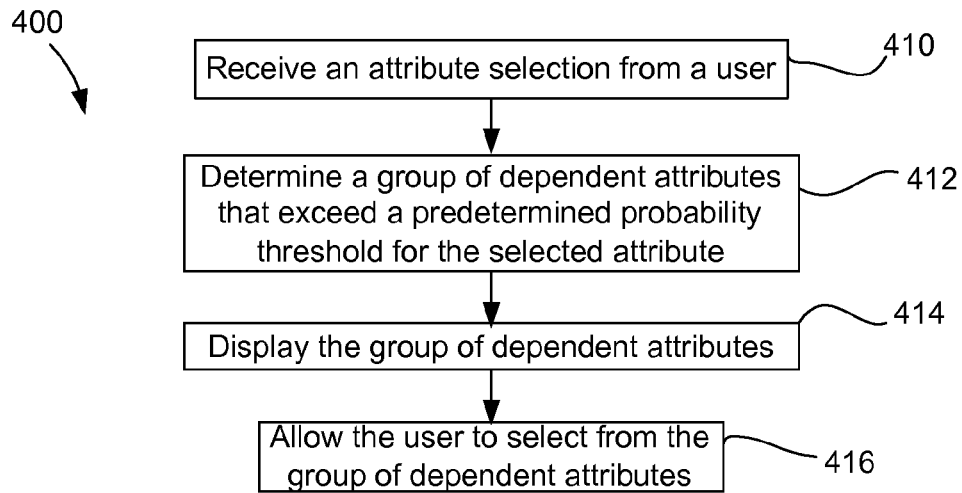
FIG. 4 is a flow chart illustrating a method for guiding user selections of attribute combinations according to one embodiment.

Media distribution systems (e.g., the Rhapsody™ service offered by RealNetworks, Inc. of Seattle, Wash.) or media playback systems (e.g., an MP3 player) typically include recommendation systems for providing a list of one or more recommended media content items, such as media content data streams and/or media content files, for possible selection by a user. The list may be generated by identifying media content items based on attributes that are either explicitly selected by a user or implicitly derived from past user selections or observed user behavior. Examples of media content items may include, for instance, songs, photographs, television episodes, movies, or other multimedia content. Several example embodiments disclosed herein are directed to audio (e.g., music) files. However, an artisan will understand from the disclosure herein that the systems and methods may be applied to any audio, video, audio/video, text, animations, and/or other multimedia data.

Associating metadata with media content to facilitate user searches and/or generation of recommendation lists is a time-consuming process. Typically, a user is required to listen to or view a content item and then complete a detailed questionnaire for evaluating the content item with respect to dozens or possibly hundreds of attributes. Today, large databases of metadata are available in many domains of digital content, such as music or film. However, the rapidly increasing amount of content being added to content databases makes it increasingly difficult and expensive to manually maintain these databases. Further, the rapid pace of adding content to content databases may increase errors or inconsistencies between parameters defined in the metadata.

Thus, the methods and systems disclosed herein verify and control the quality of metadata associated with a media data file. In one embodiment, a first attribute is selected from metadata associated with a media data file and an attribute dependency corresponding to the first attribute is determined. The metadata may be searched to determine whether it includes a second attribute that satisfies the dependency. If the dependency is not satisfied, the metadata is flagged for reevaluation. The metadata may also be flagged for reevaluation, for example, if the metadata includes inconsistent attributes, if the total number of assigned attributes within the metadata does not exceed a predetermined value, or if an expected attribute dimension is missing or does not include an expected number of defined attributes. In certain embodiments, user selections are controlled to provide consistent attribute combinations.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described will be illustrated as software modules or components. As used herein, a software module or component may include any type of computer instruction or computer executable code located within a memory device and/or transmitted as electronic signals over a system bus or wired or wireless network. A software component may, for instance, comprise one or more physical or logical blocks of computer instructions, which may be organized as a routine, program, object, component, data structure, etc., that performs one or more tasks or implements particular abstract data types.

In certain embodiments, a particular software component may comprise disparate instructions stored in different locations of a memory device, which together implement the described functionality of the component. Indeed, a component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software components may be located in local and/or remote memory storage devices. In addition, data being tied or rendered together in a database record may be resident in the same memory device, or across several memory devices, and may be linked together in fields of a record in a database across a network.

System Overview

FIG. 1 is a block diagram of a system 100 for accurately categorizing and verifying deep meta data associated with media content according to one embodiment. The system 100 includes a categorization component 102, a media content database 104, and a quality analysis component 106. The media content database 104 includes media data files 108 and associated deep metadata 110. The media data files 108 may include, for example, audio data files, video data files, audio/video data files, and/or multimedia data files. Each media data file 108 may be associated with customized deep metadata 110 that uniquely identifies the media data file 108 and describes its content based on a plurality of defined attributes.

FIG. 2 graphically illustrates an example deep metadata 110 data structure corresponding to an audio data file according to one embodiment. The example deep metadata 110 includes genre, mood, instruments, instrument variants, style, musical setup, dynamics, tempo, beats per minute, key, era/epoch, metric, country, language, situation, character, popularity and rhythm. An artisan will recognize from the disclosure herein that the example deep metadata 110 shown in FIG. 2 is only a small subset of possible categories of attributes that may be defined for a particular audio data file. Further, an artisan will also recognize that the categories shown in FIG. 2 may each include one or more attributes or subcategories. For example, the genre category may include a plurality of micro-genres, and the instruments category may include a string subcategory, a percussion subcategory, a brass subcategory, a wind subcategory, and other musical instrument subcategories. In one example embodiment, approximately 926 attributes are grouped in the 18 categories shown in FIG. 2.

Returning to FIG. 1, the categorization component 102 and the quality analysis component 106 according to one embodiment use a common set of categorization rules 114 to standardize and control the quality of the deep metadata 110 associated with the media data files 108. The categorization rules 114 include attribute combination probabilities 116 that define the likelihood of a particular media data file 108 having a combination of two or more attributes. For example, "country: Greece" and "language: Greek" are highly correlated attributes. Thus, there is a high probability that a particular song with Greek lyrics, for example, has Greece assigned to the "country" category shown in FIG. 2.

The categorization rules 114 include thresholds 118 at which the attribute combination probabilities trigger actions by the system 100. For example, to indicate that a combination of user selected attributes is unlikely, the categorization component 102 may display an error message when a corresponding attribute combination probability 116 is below a predetermined probability threshold 118. As another example, when a user selects a first attribute, the categorization component 102 may display one or more second attributes that, if combined with the first attribute, exceed a certain probability threshold 118. Thus, the user can easily select attribute combinations that are most likely to occur in a particular media data file 108.

As discussed in detail below, the quality analysis component 106 also uses the categorization rules 114 to analyze attribute combinations and other characteristics of the deep metadata 110 previously stored in the media content database 104. Users may have generated large amounts of deep metadata 110 that have been stored in the media content database 104 using manual or semi-automatic processes. Some commercial music databases, for example, currently include approximately 1 million to 2 million songs with an additional 5,000 to 10,000 songs being added each month. Because of this high demand, the deep metadata 110 in such music databases may include errors and inconsistent attribute combinations.

Rather than manually re-categorizing the deep metadata 110 corresponding to each song in a music database to look for errors, the deep metadata quality analysis tool 106 is configured to scan the deep metadata 110 to find attribute combinations corresponding to a particular song that have attribute combination probabilities 116 below predetermined thresholds 118. The quality analysis component 106 may flag inconsistent attribute combinations falling below the predetermined thresholds 118 for reevaluation. Thus, users may focus their reevaluation resources on the detected inconsistent attribute combinations.

An artisan will recognize from the disclosure herein that the categorization component 102 or the quality analysis component 106 may be used together or separately. Further, although shown as separate components, an artisan will recognize from the disclosure herein that the categorization component 102 and the quality analysis component 106 may be combined in a single component. In addition to scanning the database 104 for errors, the quality analysis component 106 may perform the methods described herein on deep metadata generated by the categorization component 102 before it is added to the media content database 104. Further, rather than scanning the entire media content database 104 for errors, the quality analysis component 106 may detect errors while testing predefined music channels.

Categorization Component

The categorization component 102 is configured to generate a set of deep metadata 110 corresponding to the new media data file 112 by categorizing the content of the new media data file 112 according to predetermined attributes. In one embodiment, the categorization component 102 displays one or more lists of predetermined attributes to a user and allows the user to select among the predetermined attributes based on the user's evaluation of the new media data file 112. The categorization component 102 then stores the selected attributes (as deep metadata 110) with the new media data file 112 in the media content database 104.

The categorization component 102 is configured to guide the user through the categorization process according to the categorization rules 114. For example, the categorization component 102 may display a list of likely attributes to the user based on a previously selected attribute. The list of likely attributes is based on the predetermined attribute combination probabilities 116. For example, the new media data file 112 may be a song categorized in the "rock" genre. When the user is selecting instruments from the instruments category for the rock song, the categorization component 102 displays a list of instruments to the user that are most likely to be used when creating rock music. The user may then select one or more instruments from the list to include in the deep metadata 110 corresponding to the song.

A particular threshold 118 may define a probability level for determining which attributes to display in a list of most likely attributes for a particular category. If a 50% threshold level for the instruments category is used in the above example, then the categorization component 102 displays only those instruments that have an attribute combination probability 116 (e.g., when combined with the rock genre) of over 50%. Thus, the categorization component 102 may list instruments such as electric guitar, drums, bass guitar and keyboard (which may each be used in at least 50% of rock songs), while not displaying instruments such as piano, harmonica, violin, flute, banjo, mandolin and tambourines (which may each be used in less than 50% of rock songs). In one embodiment, the attribute combination probabilities 116 may be displayed with their corresponding instruments in the list.

In one embodiment, the user may select an attribute that is not in the displayed list of most likely attributes for a particular category. In one such embodiment, the categorization component 102 displays a warning when the user selects an attribute that has an attribute combination probability 116 below the predetermined threshold 118. The categorization component 102 may also set a flag in the deep metadata 110 corresponding to the new media data file 112 to indicate that the attribute combination probability 116 falls below the predetermined threshold 118. Thus, a user (e.g., a supervisor) may be notified that the corresponding attribute combination may need to be reevaluated.

In certain embodiments, the categorization component 102 also automatically determines at least a portion of the deep metadata 110 associated with the new media data file 112. For example, the new media data file 112 may include high-level metadata 120 that the categorization component 102 may use to automatically populate a portion of the corresponding deep metadata 110. FIG. 3 graphically illustrates an example high-level metadata 120 data structure that may be initially included in the new media data file 112 according to one embodiment. The high-level metadata 120 may be provided by a publisher or other source of the new media data file 112. When the new media data file 112 is an audio file, the high-level metadata may include, for example, song title, artist name, album name, album cover image, track number, genre, file type and song duration.

The categorization component 102 may also automatically determine at least a portion of the deep metadata 110 associated with the new media data file 112 using audio analysis techniques, as is known in the art. For example, audio analysis techniques may be used to determine attributes such as tonality, tempo, rhythm, repeating sections within a music track, presence of certain easily identified instruments (e.g., snares and kick drums), bass patterns, and harmony. Audio analysis may also be used to estimate some attributes such as a "rap" style or a distorted guitar.

FIG. 4 is a flow chart illustrating a method 400 for guiding user selections of attribute combinations according to one embodiment. The method 400 may be used, for example, by the categorization component 102 shown in FIG. 1 for generating deep metadata 110 corresponding to the new media data file 112. The method 400 begins with the categorization component 102 receiving 410 an attribute selection from a user. In response to the user's selection, the categorization component 102 determines 412 a group of dependent attributes that exceed a predetermined probability threshold for the selected attribute.

The categorization component 102 then displays 414 the group of dependent attributes to the user. As discussed above, the group of dependent attributes may be displayed in a list of most likely attributes to be associated with the selected attribute. The categorization component 102 also allows 416 the user to select from the group of dependent attributes that exceed the predetermined probability threshold. Thus, the user may quickly select those attributes that are most likely to be associated with a previously selected attribute or category.

Figure 5:
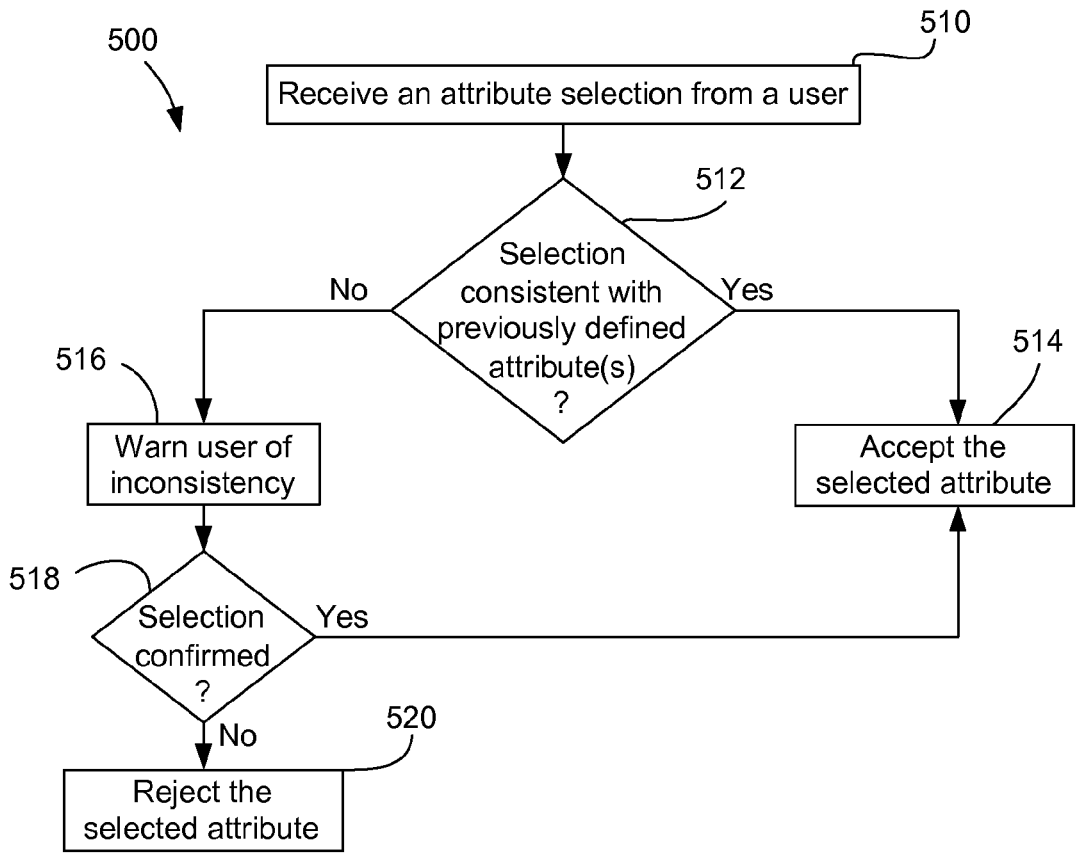
FIG. 5 is a flow chart illustrating a method for validating user selected attributes according to one embodiment.

FIG. 5 is a flow chart illustrating a method 500 for validating user selected attributes according to one embodiment. The method 500 may be performed, for example, by the categorization component 102 shown in FIG. 1 for generating deep metadata 110 corresponding to the new media data file 112. The method 500 begins with the categorization component 102 receiving 510 an attribute selection from a user and determining 512 whether the user's selection is consistent with one or more previously defined attributes. In one embodiment, the determination is based on whether a probability of combining the user selected attribute with the one or more previously defined attributes exceeds a predetermined probability threshold. If the user's selection is consistent with the one or more previously defined attributes, the categorization component 102 accepts 514 the selected attribute and adds an indication of the selected attribute to the deep metadata 110 associated with the new media data file 112.

If, however, the user's selection is inconsistent with the one or more previously defined attributes (e.g., because the probability of combining the user selected attribute does not exceed the threshold), then the categorization component 102 warns 516 the user of the detected inconsistency. For example, the categorization component 102 may display the corresponding attribute combination probability and threshold to the user, and request that the user confirm the decision to select the attribute in view of the inconsistency. The categorization component 102 then determines 518 whether the user confirms the selection of the inconsistent attribute. If the user confirms the selection, then the categorization component 102 accepts 514 the selected attribute. If, however, the user does not confirm the selected attribute, then the categorization component 102 rejects 520 the selected attribute and does not add an indication of the selected attribute to the corresponding deep metadata 110.

Figure 6:
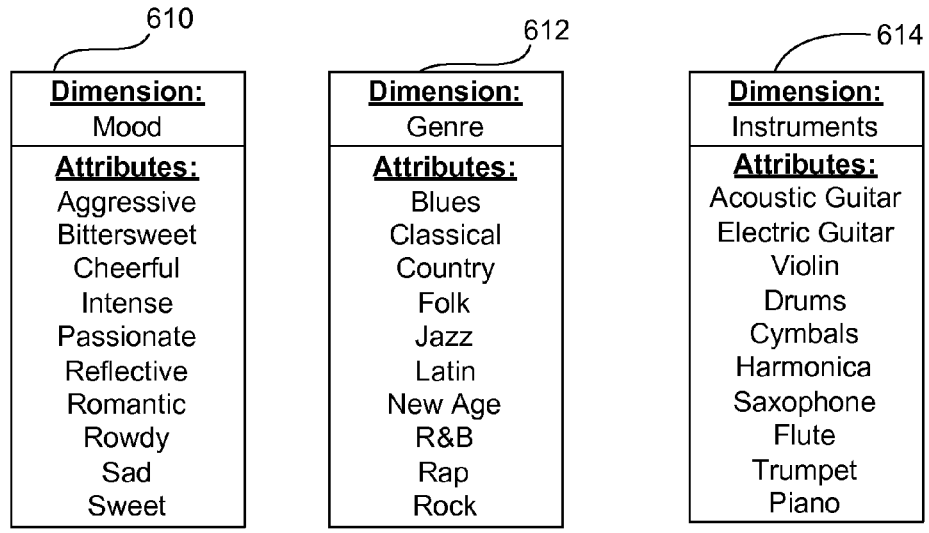
FIG. 6 graphically illustrates data structures corresponding to a "mood" dimension, a "genre" dimension, and an "instruments" dimension according to an example embodiment.

In one embodiment, two or more of the deep metadata categories shown in FIG. 2 are represented as different dimensions of a multidimensional database. Thus, the deep metadata categories may be referred to herein as "dimensions" with one or more user selectable attributes corresponding to each dimension. For example, FIG. 6 graphically illustrates data structures corresponding to a "mood" dimension 610, a "genre" dimension 612, and "instruments" dimension

614 according to an example embodiment. The mood dimension 610 includes attributes such as aggressive, bittersweet, cheerful, intense, passionate, reflective, romantic rowdy, sad, and sweet. The genre dimension 612 includes attributes such as blues, classical, country, folk, jazz, Latin, new age, R&B, rap, and rock. The instruments dimension 614 includes attributes such as acoustic guitar, electric guitar, violin, drum, cymbal, harmonica, saxophone, flute, trumpet, and piano.

Certain dimensions may allow a user to select multiple attributes. For example, a song may include multiple instruments that the user may select from the instruments dimension 614. Other dimensions may allow a user to select only a single attribute from the dimension. For example, in one embodiment, the user may select only a single attribute from a the mood dimension 610 and a single attribute from the genre dimension 612. However, an artisan will recognize from the disclosure herein that in other embodiments multiple attributes may be selected from the mood dimension 610. For example, a song may be both cheerful and romantic.

Figure 7:
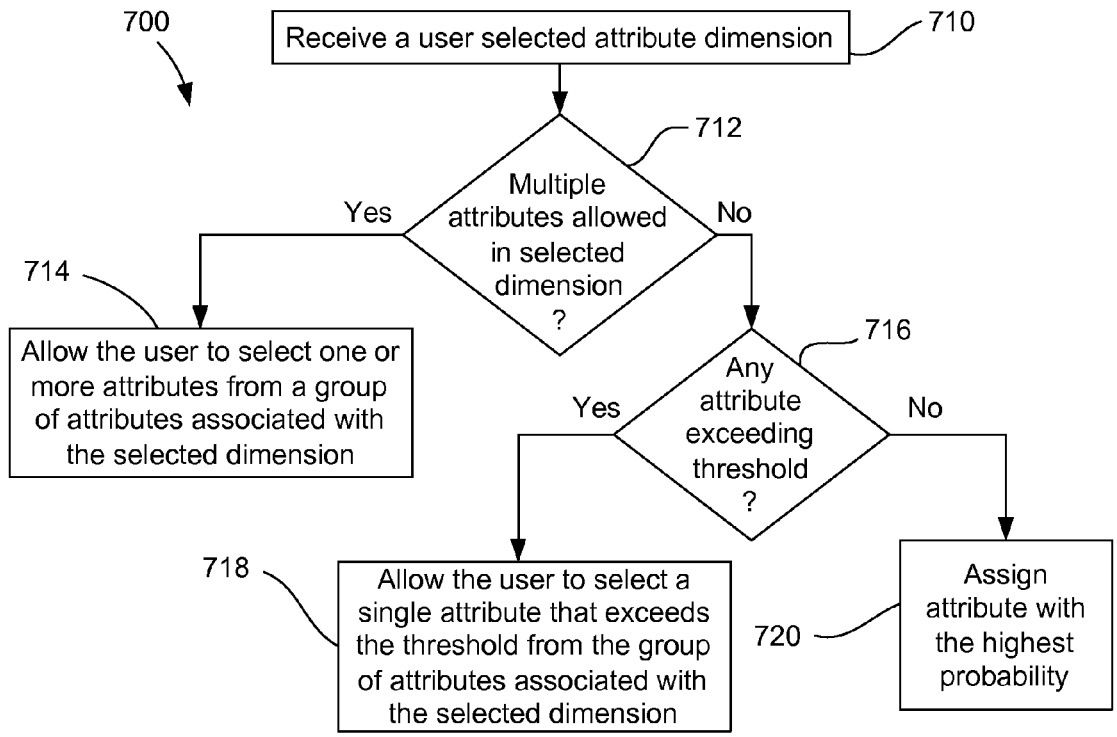
FIG. 7 is a flow chart illustrating a method for controlling user selection of multiple attributes within a single attribute dimension according to one embodiment.

FIG. 7 is a flow chart illustrating a method 700 for controlling user selection of multiple attributes within a single attribute dimension according to one embodiment. The method 700 may be performed, for example, by the categorization component 102 shown in FIG. 1 for generating deep metadata 110 corresponding to the new media data file 112.

The method 700 begins with the categorization component 102 receiving 710 a user selected attribute dimension and determining 712 whether a user is allowed to select multiple attributes corresponding to the selected dimension. If multiple attributes are allowed, the categorization component 102 allows 714 the user to select one or more attributes from a group of attributes associated with the selected dimension. As discussed above, in certain embodiments the user may be restricted to selecting only those attributes in the group (in combination with a previously selected attribute) that have associated attribute combination probabilities 116 exceeding a corresponding threshold 118.

If multiple attributes are not allowed in the selected dimension, then the categorization component 102 determines 716 whether any attribute (in combination with a previously selected attribute) in the group exceeds a combination threshold 118. If one or more attributes exceed the combination threshold 118, the categorization component 102 allows 718 the user to select a single attribute that exceeds the threshold from the group of attributes associated with the selected dimension. If, however, no attribute in the selected dimension exceeds the threshold, then the categorization component 102 assigns 720 an attribute from the group with the highest probability of being combined with the previously selected attribute. In one embodiment, the categorization component 102 allows the user to override this automatic selection to select any attribute from the group of attributes associated with the selected dimension.

Quality Analysis Component

As discussed above, the quality analysis component 106 is configured to scan the media content database 104 to analyze attribute combinations and other characteristics of the deep metadata 110 previously stored in the media content database 104. In addition, or in another embodiment, the quality analysis component 106 may also be configured to analyze attribute combinations and other characteristics of deep metadata being generated by the categorization component 102 before it is added to the media content database 104. Thus, while the examples discussed below are directed to analyzing the deep metadata 110 stored in the media content database 104, they may also be applied to the categorization component 102 during the categorization process.

The quality analysis component 106 uses the categorization rules 114 to determine whether specific attribute combinations are inconsistent. For example, the quality analysis component 106 may flag inconsistent attribute combinations falling below the predetermined thresholds 118 for reevaluation. The quality analysis component 106 may also determine whether a required dimension is missing, whether one or more attributes in a particular dimension have not been defined, or whether the overall number of dimensions defined for a particular media data file 108 is less than an expected value.

Figure 8:
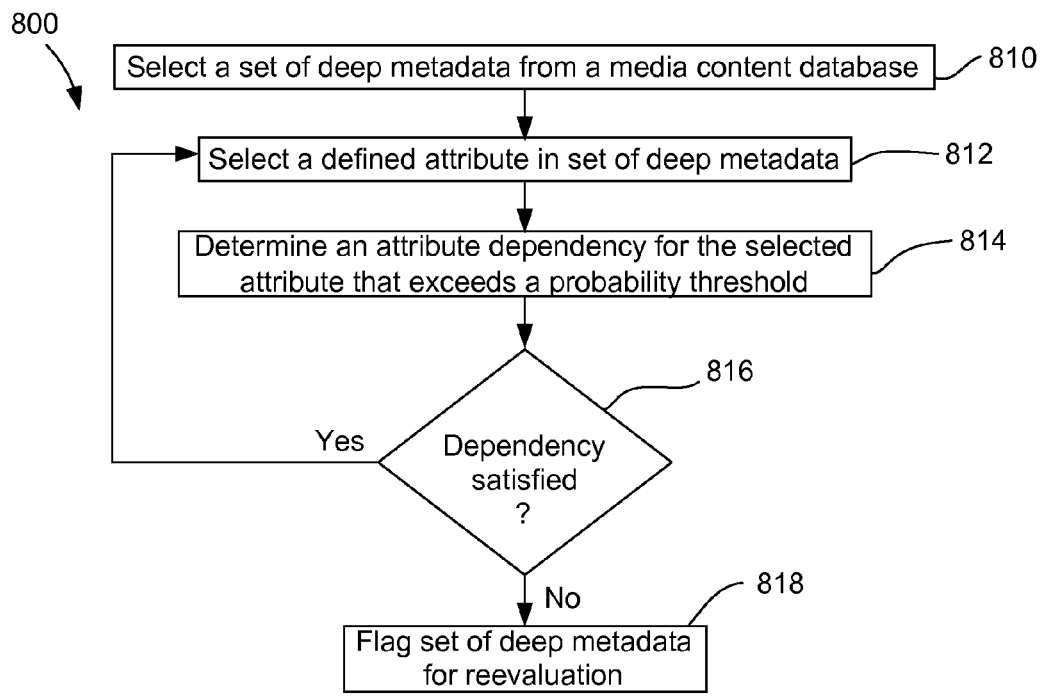
FIG. 8 is a flow chart illustrating a method for analyzing attribute combinations associated with a media data file according to one embodiment.

FIG. 8 is a flow chart illustrating a method 800 for analyzing attribute combinations associated with a media data file 108 according to one embodiment. The method 800 may be used, for example, by the quality analysis component 106 shown in FIG. 1 for the deep metadata 110 stored in the media content database 104. The method 800 begins with the quality analysis component 106 selecting 810 a set of deep metadata from the media content database 104. As discussed above, the set of deep metadata 110 may be associated with a particular media data file 108. The selection may occur, for example, while the quality analysis component 106 scans the media content database for possible errors in the deep metadata 104.

The quality analysis component 106 selects 812 a defined attribute from the set of deep metadata 812 and determines 814 an attribute dependency for the selected attribute that exceeds a probability threshold. For example, the quality analysis component 106 may select a defined musical instrument attribute that indicates the use of a drum machine. From a set of attribute combination probabilities 116 defined in the categorization rules 114, the quality analysis component 106 may then determine that there is a high probability (e.g., exceeding a predetermined threshold) that a drum machine is used in a song with a "dance" genre.

The method 800 continues with the quality analysis component 106 querying 816 whether the attribute dependency is satisfied (e.g., whether the set of deep metadata includes an attribute combination that satisfies the dependency). If the dependency is not satisfied, the quality analysis component 106 flags 818 the set of deep metadata for reevaluation. For example, returning to the drum machine/dance genre example above, the quality analysis component 106 may determine that the probability of a drum machine being used in a dance song exceeds a probability threshold of, for example, 75%. The quality analysis component 106 would then determine whether the song is categorized in the dance genre. If the set of deep metadata does not include an attribute indicating the dance genre, then the quality analysis component 106 sets the flag to indicated the set of metadata may include an inconsistence and should be reevaluated.

Figure 9:
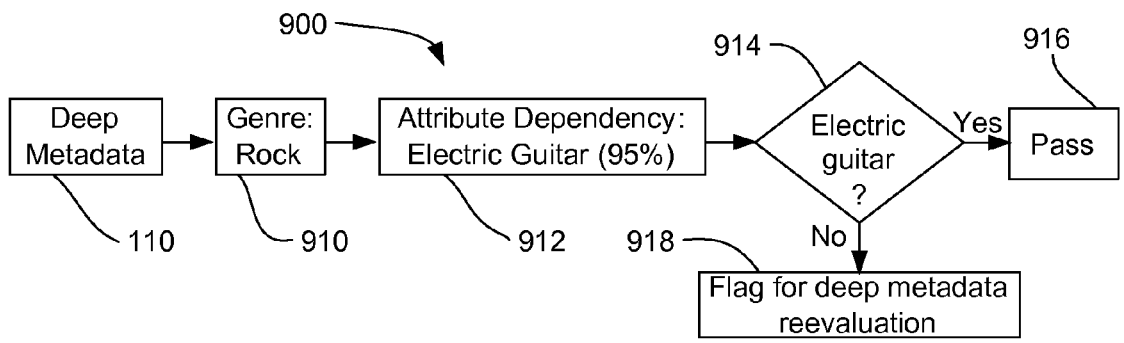
FIG. 9 is a flow chart of an example verification process that uses the method illustrated in FIG. 8 according to an example embodiment.

FIG. 9 is a flow chart of an example verification process 900 that uses the method 800 illustrated in FIG. 8. From a set of deep metadata 110 corresponding to a particular audio file stored in the media content database 104, the quality analysis component 106 determines that the audio file is categorized as a rock song. From the attribute combination probabilities 116 in the categorization rules 114, the quality analysis component 106 determines an attribute dependency 912 specifying that there is a 95% chance that rock songs include an electric guitar.

Accordingly, the quality analysis component 106 queries 914 whether the dataset related to the audio file includes an electric guitar. If the set of deep metadata 110 indicates the use of an electric guitar in the audio file, then the test passes 916 and the quality analysis component 106 may select another attribute and/or attribute combination to analyze. If, however, the set of deep metadata 110 does not indicate the use of an electric guitar in the audio file, then the quality analysis component 106 flags the set of deep metadata 110 for reevaluation to determine whether the set of deep metadata 110 is incomplete and should include an indication of an electric guitar, whether the audio file is incorrectly categorized as a rock song, or whether the set of deep metadata 110 is complete and correct.

Figure 10:
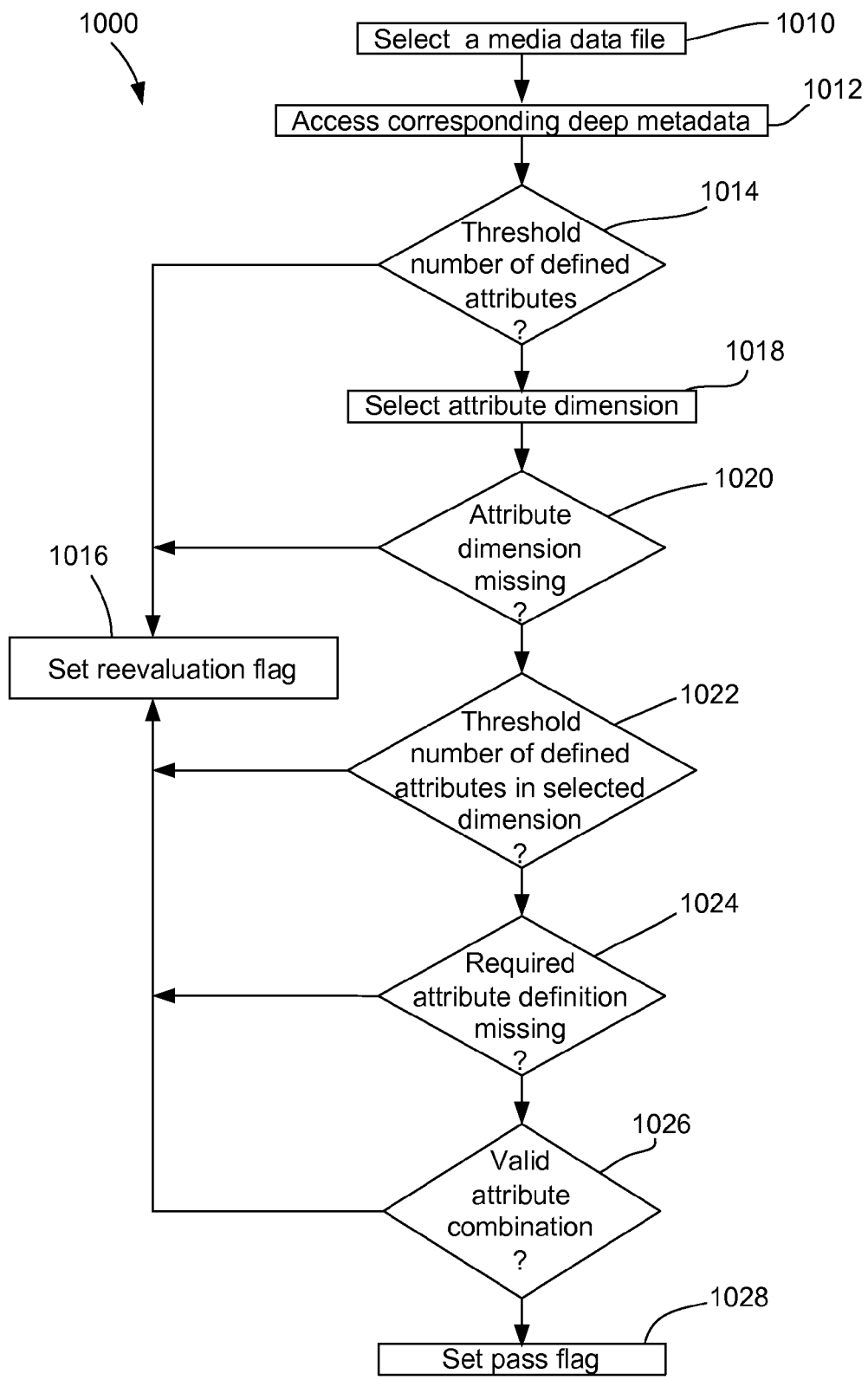
FIG. 10 is a flow chart illustrating a method for analyzing the quality of deep metadata associated with a media data file according to one embodiment.

FIG. 10 is a flow chart illustrating a method 1000 for analyzing the quality of deep metadata associated with a media data file 110 according to one embodiment. The method 1000 may be performed, for example, by the quality analysis component 106 shown in FIG. 10. The method 1000 begins with the quality analysis component 106 selecting a media data file 108 to analyze (e.g., during a scan of the media content database 104) and accessing 1012 a set of deep metadata 110 corresponding to the selected media data file 108.

The quality analysis component 106 queries 1014 whether the set of deep metadata 110 includes a threshold number of defined attributes. If the set of deep metadata 110 does not include a threshold number of defined attributes, the quality analysis component 106 sets 1016 a reevaluation flag corresponding to the selected media data file 108. For example, in one embodiment of a music database, approximately 920 to 960 possible attributes are grouped into the 18 categories of deep metadata 110 shown in FIG. 2. Of the total possible attributes, the average audio file includes approximately 40 to 60 defined attributes. However, if deep metadata corresponding to a particular audio file only includes 10 to 15 defined attributes, then the quality analysis component 106 flags the audio file to indicate that its corresponding deep metadata may be incomplete or inaccurate.

The quality analysis component 106 may also select 1018 an attribute dimension (as discussed above in relation to FIGS. 6A, 6B and 6C) in the set of deep metadata 110 to analyze. The quality analysis component 106 queries 1020 whether the attribute dimension is missing (e.g., no attributes have been defined for the selected dimension). If the attribute dimension is missing, the quality analysis component 106 sets 1016 the reevaluation flag to indicate the possibility of missing data. In one embodiment, the quality analysis component 106 only checks for a missing dimension if the particular dimension is required to have at least one defined attribute.

The quality analysis component 106 may also query 1022 whether there is a threshold number of defined attributes in the selected dimension. If there is not a threshold number of defined attributes in the selected dimension, then the a quality analysis component 106 sets 1016 the reevaluation flag indicate the possibility of missing or incorrect data.

The quality analysis component 106 may also query 1024 whether a required attribute definition is missing. For example, every audio file in a music database may require a defined genre. If the required attribute is missing from the set of deep metadata 110, the quality analysis component 106 sets 1016 the reevaluation flag to indicate the missing data.

As discussed above with respect to FIGS. 8 and 9, the quality analysis component 106 may also query 1026 whether an attribute combination is valid or consistent. If the attribute combination is not valid, or falls below a predetermined probability threshold, the quality analysis component 106 sets 1016 the reevaluation flag to indicate the inconsistency and notify the system 100 or a user that the media data file 108 should be analyzed again. If, on the other hand, the quality analysis component 106 does not detect missing data or possible errors in the set of deep metadata 110, then the quality analysis component 106 sets 1028 a pass flag to indicate that the selected media data file 108 meets an acceptable quality standard.

Example Media Distribution System

Figure 11:
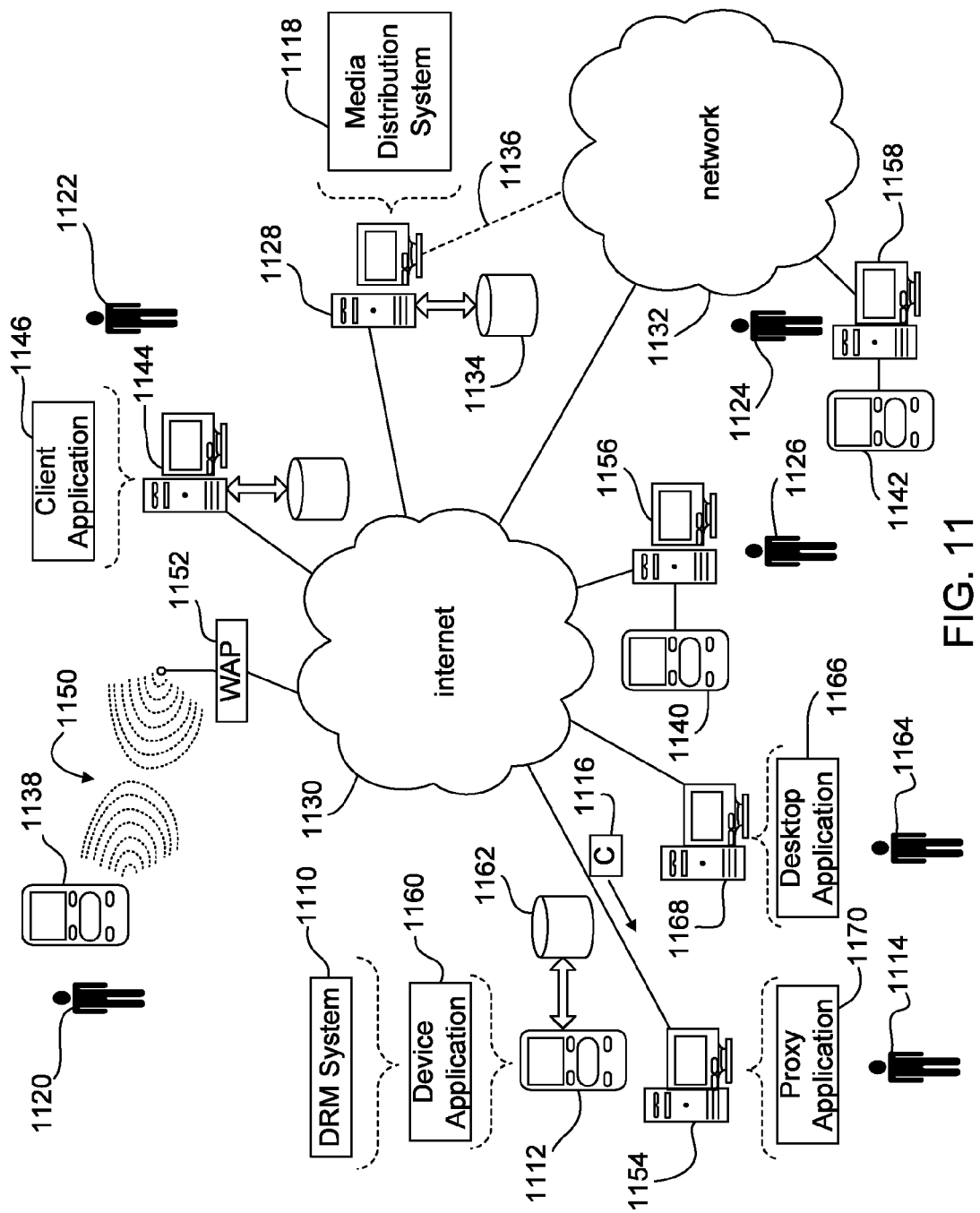
FIG. 11 is a block diagram of a media distribution system, a client application, a proxy application, and a personal media device coupled to a distributed computing network according to one embodiment.
Figure 12:
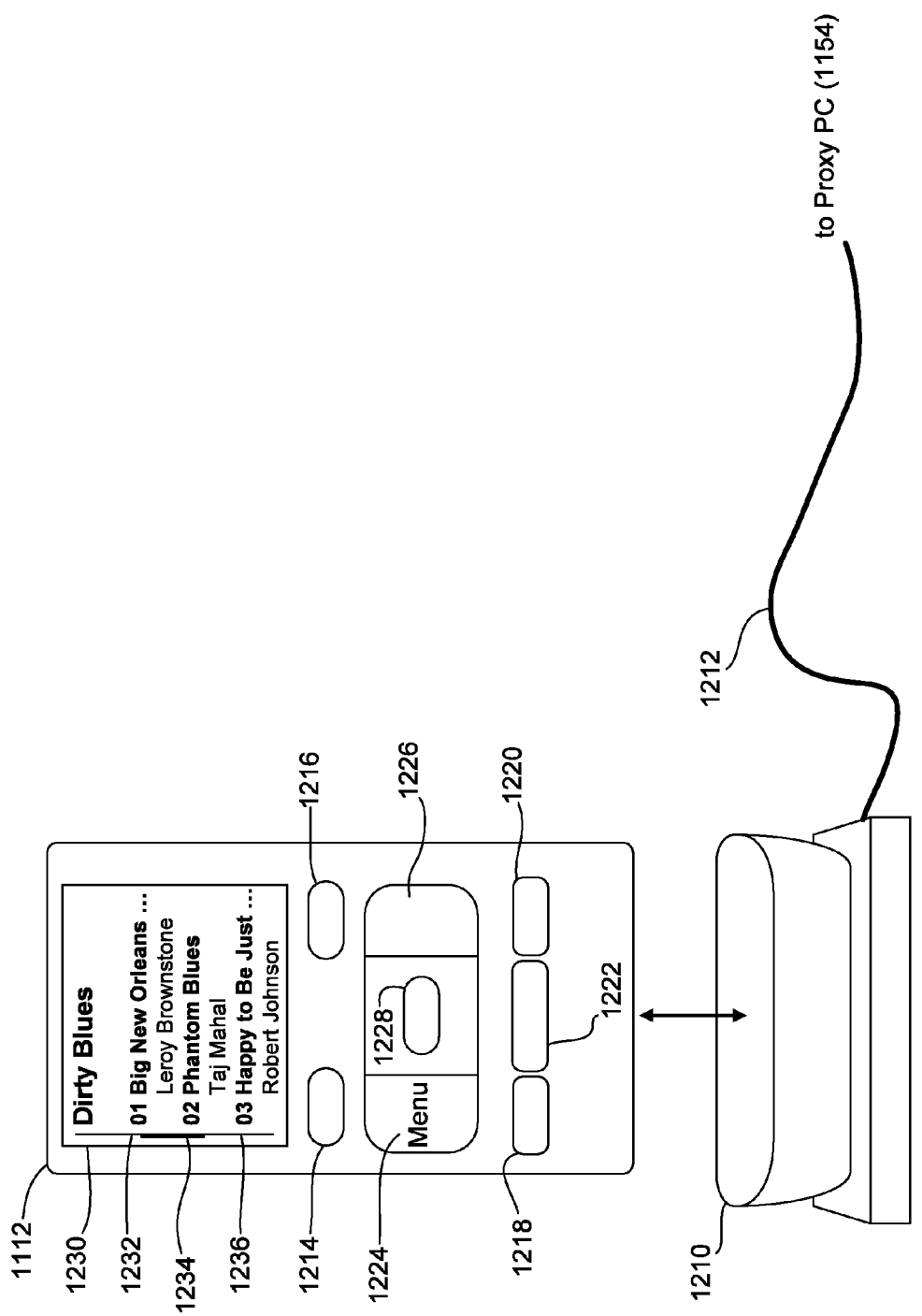
FIG. 12 graphically and schematically illustrates the personal media device shown in FIG. 11 according to one embodiment.
Figure 13:
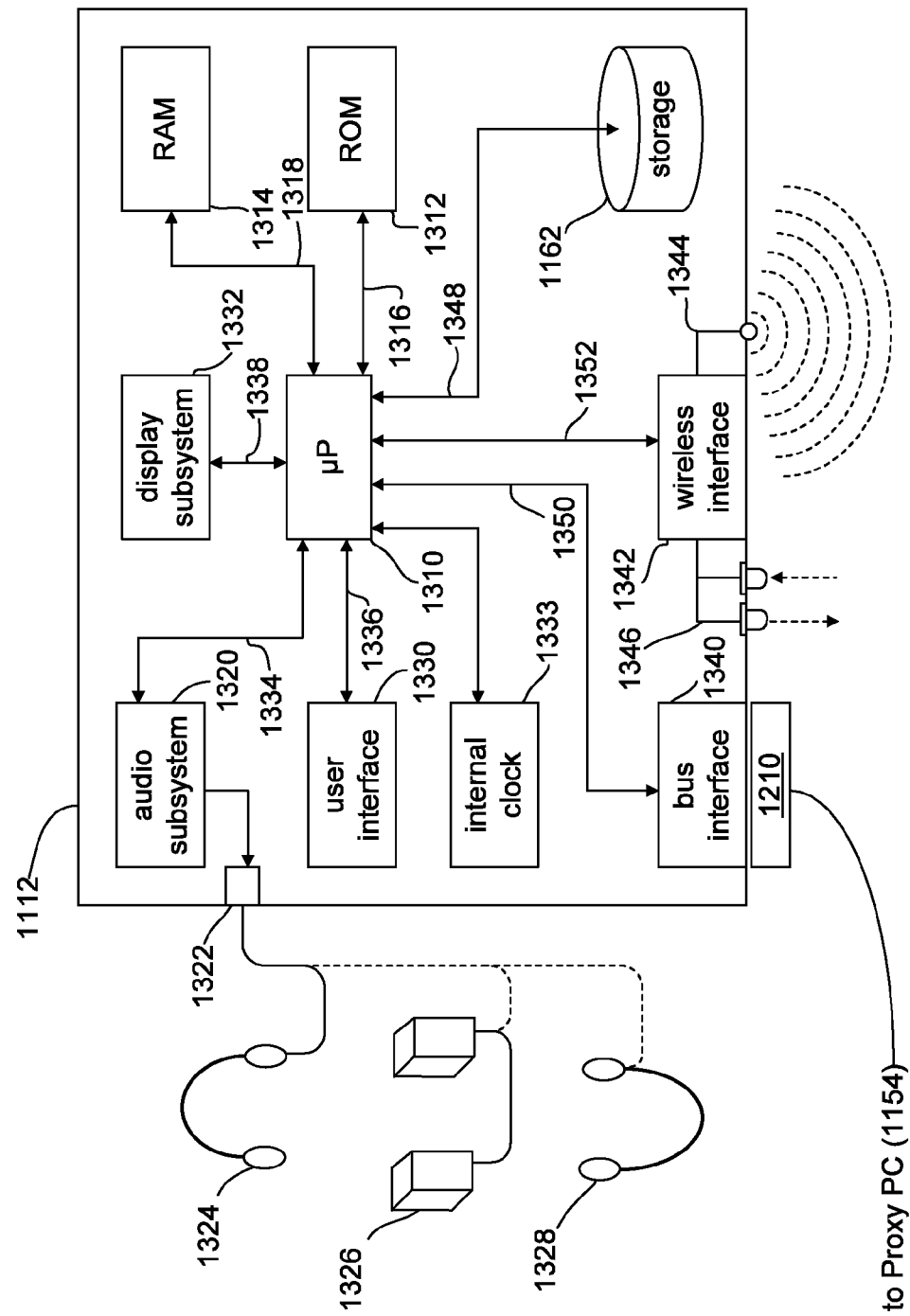
FIG. 13 is a block diagram of the personal media device shown in FIG. 11 according to one embodiment.

FIGS. 11, 12 and 13 illustrate an example media distribution system and personal media device usable with the categorization and deep metadata quality analysis systems and methods described above. The systems and devices illustrated in FIGS. 11, 12 and 13 are provided by way of example only and are not intended to limit the disclosure.

Referring to FIG. 11, there is shown a DRM (i.e., digital rights management) process 1110 that is resident on and executed by a personal media device 1112. As will be discussed below in greater detail, the DRM process 1110 allows a user (e.g., user 1114) of the personal media device 1112 to manage media content resident on the personal media device 1112. The personal media device 1112 typically receives media content 1116 from a media distribution system 1118.

As will be discussed below in greater detail, examples of the format of the media content 1116 received from the media distribution system 1118 may include: purchased downloads received from the media distribution system 1118 (i.e., media content licensed to e.g., the user 1114); subscription downloads received from the media distribution system 1118 (i.e., media content licensed to e.g., the user 1114 for use while a valid subscription exists with the media distribution system 1118); and media content streamed from the media distribution system 1118, for example. Typically, when media content is streamed from e.g., a computer 1128 to the personal media device 1112, a copy of the media content is not permanently retained on the personal media device 1112. In addition to the media distribution system 1118, media content may be obtained from other sources, examples of which may include but are not limited to files ripped from music compact discs.

Examples of the types of media content 1116 distributed by the media distribution system 1118 include: audio files (examples of which may include but are not limited to music files, audio news broadcasts, audio sports broadcasts, and audio recordings of books, for example); video files (examples of which may include but are not limited to video footage that does not include sound, for example); audio/video files (examples of which may include but are not limited to a/v news broadcasts, a/v sports broadcasts, feature-length movies and movie clips, music videos, and episodes of television shows, for example); and multimedia content (examples of which may include but are not limited to interactive presentations and slideshows, for example).

The media distribution system 1118 typically provides media data streams and/or media data files to a plurality of users (e.g., users 1114, 1120, 1122, 1124, 1126). Examples of such a media distribution system 1118 may include the Rhapsody™ service offered by RealNetworks, Inc. of Seattle, Wash.

The media distribution system 1118 is typically a server application that resides on and is executed by a computer 1128 (e.g., a server computer) that is connected to a network 1130 (e.g., the Internet). The computer 1128 may be a web server running a network operating system, examples of which may include but are not limited to Microsoft Windows 2000 Server™, Novell Netware™, or Redhat Linux™.

Typically, the computer 1128 also executes a web server application, examples of which may include but are not limited to Microsoft IIS™, Novell Webserver™, or Apache Webserver™, that allows for HTTP (i.e., HyperText Transfer Protocol) access to the computer 1128 via the network 1130. The network 1130 may be connected to one or more secondary networks (e.g., network 1132), such as: a local area network; a wide area network; or an intranet, for example.

The instruction sets and subroutines of the media distribution system 1118, which are typically stored on a storage device 1134 coupled to the computer 1128, are executed by one or more processors (not shown) and one or more memory architectures (not shown) incorporated into the computer 1128. The storage device 1134 may include but is not limited to a hard disk drive, a tape drive, an optical drive, a RAID array, a random access memory (RAM), or a read-only memory (ROM).

The users 1114, 1120, 1122, 1124, 1126 may access the media distribution system 1118 directly through the network 1130 or through the secondary network 1132. Further, the computer 1128 (i.e., the computer that executes the media distribution system 1118) may be connected to the network 1130 through the secondary network 1132, as illustrated with phantom link line 1136.

The users 1114, 1120, 1122, 1124, 1126 may access the media distribution system 1118 through various client electronic devices, examples of which may include but are not limited to personal media devices 1112, 1138, 1140, 1142, client computer 1144, personal digital assistants (not shown), cellular telephones (not shown), televisions (not shown), cable boxes (not shown), internet radios (not shown), or dedicated network devices (not shown), for example.

The various client electronic devices may be directly or indirectly coupled to the network 1130 (or the network 1132). For example, the client computer 1144 is shown directly coupled to the network 1130 via a hardwired network connection. Further, the client computer 1144 may execute a client application 1146 (examples of which may include but are not limited to Microsoft Internet Explorer™, Netscape Navigator™, RealRhapsody™client, RealPlayer™ client, or a specialized interface) that allows e.g., the user 1122 to access and configure the media distribution system 1118 via the network 1130 (or the network 1132). The client computer 1144 may run an operating system, examples of which may include but are not limited to Microsoft Windows™, or Redhat Linux™

The instruction sets and subroutines of the client application 1146, which are typically stored on a storage device 1148 coupled to the client computer 1144, are executed by one or more processors (not shown) and one or more memory architectures (not shown) incorporated into the client computer 1144. The storage device 1148 may include but is not limited to a hard disk drive, a tape drive, an optical drive, a RAID array, a random access memory (RAM), or a read-only memory (ROM).

As discussed above, the various client electronic devices may be indirectly coupled to the network 1130 (or the network 1132). For example, the personal media device 1138 is shown wireless coupled to the network 1130 via a wireless communication channel 1150 established between the personal media device 1138 and a wireless access point (i.e., WAP) 1152, which is shown directly coupled to the network 1130. The WAP 1152 may be, for example, an IEEE 802.11a, 802.11b, 802.11g, Wi-Fi, and/or Bluetooth device that is capable of establishing the secure communication channel 1150 between the personal media device 1138 and the WAP 1152. As is known in the art, IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

In addition to being wirelessly coupled to the network 1130 (or the network 1132), personal media devices may be coupled to the network 1130 (or the network 1132) via a proxy computer (e.g., proxy computer 1154 for the personal media device 1112, proxy computer 1156 for the personal media device 1140, and proxy computer 1158 for the personal media device 1142, for example).

Example Personal Media Device

For example and referring also to FIG. 12, the personal media device 1112 may be connected to the proxy computer 1154 via a docking cradle 1210. Typically, the personal media device 1112 includes a bus interface (to be discussed below in greater detail) that couples the personal media device 1112 to the docking cradle 1210. The docking cradle 1210 may be coupled (with cable 1212) to e.g., a universal serial bus (i.e., USB) port, a serial port, or an IEEE 1394 (i.e., FireWire) port included within the proxy computer 1154. For example, the bus interface included within the personal media device 1112 may be a USB interface, and the docking cradle 1210 may function as a USB hub (i.e., a plug-and-play interface that allows for "hot" coupling and uncoupling of the personal media device 1112 and the docking cradle 1210).

The proxy computer 1154 may function as an Internet gateway for the personal media device 1112. Accordingly, the personal media device 1112 may use the proxy computer 1154 to access the media distribution system 1118 via the network 1130 (and the network 1132) and obtain the media content 1116. Specifically, upon receiving a request for the media distribution system 1118 from the personal media device 1112, the proxy computer 1154 (acting as an Internet client on behalf of the personal media device 1112), may request the appropriate web page/service from the computer 1128 (i.e., the computer that executes the media distribution system 1118). When the requested web page/service is returned to the proxy computer 1154, the proxy computer 1154 relates the returned web page/service to the original request (placed by the personal media device 1112) and forwards the web page/service to the personal media device 1112. Accordingly, the proxy computer 1154 may function as a conduit for coupling the personal media device 1112 to the computer 1128 and, therefore, the media distribution system 1118.

Further, the personal media device 1112 may execute a device application 1160 (examples of which may include but are not limited to RealRhapsody™ client, RealPlayer™ client, or a specialized interface). The personal media device 1112 may run an operating system, examples of which may include but are not limited to Microsoft Windows CE™, Redhat Linux™, Palm OS™, or a device-specific (i.e., custom) operating system.

The DRM process 1110 is typically a component of the device application 1160 (examples of which may include but are not limited to an embedded feature of the device application 1160, a software plug-in for the device application 1160, or a stand-alone application called from within and controlled by the device application 1160). The instruction sets and subroutines of the device application 1160 and the DRM process 1110, which are typically stored on a storage device 1162 coupled to the personal media device 1112, are executed by one or more processors (not shown) and one or more memory architectures (not shown) incorporated into the personal media device 1112. The storage device 1162 may be, for example, a hard disk drive, an optical drive, a random access memory (RAM), a read-only memory (ROM), a CF (i.e., compact flash) card, an SD (i.e., secure digital) card, a Smart-Media card, a Memory Stick, and a MultiMedia card, for example.

An administrator 1164 typically accesses and administers media distribution system 1118 through a desktop application 1166 (examples of which may include but are not limited to Microsoft Internet Explorer™, Netscape Navigator™, or a specialized interface) running on an administrative computer 1168 that is also connected to the network 1130 (or the network 1132).

The instruction sets and subroutines of the desktop application 1166, which are typically stored on a storage device (not shown) coupled to the administrative computer 1168, are executed by one or more processors (not shown) and one or more memory architectures (not shown) incorporated into the administrative computer 1168. The storage device (not shown) coupled to the administrative computer 1168 may include but is not limited to a hard disk drive, a tape drive, an optical drive, a RAID array, a random access memory (RAM), or a read-only memory (ROM).

Referring also to FIG. 13, a diagrammatic view of the personal media device 1112 is shown. The personal media device 1112 typically includes a microprocessor 1310, a non-volatile memory (e.g., read-only memory 1312), and a volatile memory (e.g., random access memory 1314), each of which is interconnected via one or more data/system buses 1316, 1318. The personal media device 1112 may also include an audio subsystem 1320 for providing e.g., an analog audio signal to an audio jack 1322 for removably engaging e.g., a headphone assembly 1324, a remote speaker assembly 1326, or an ear bud assembly 1328, for example. Alternatively, the personal media device 1112 may be configured to include one or more internal audio speakers (not shown).

The personal media device 1112 may also include a user interface 1330, a display subsystem 1332, and an internal clock 1333. The user interface 1330 may receive data signals from various input devices included within the personal media device 1112, examples of which may include (but are not limited to): rating switches 1214, 1216; backward skip switch 1218; forward skip switch 1220; play/pause switch 1222; menu switch 1224; radio switch 1226; and slider assembly 1228, for example. The display subsystem 1332 may provide display signals to a display panel 1230 included within the personal media device 1112. The display panel 1230 may be an active matrix liquid crystal display panel, a passive matrix liquid crystal display panel, or a light emitting diode display panel, for example.

The audio subsystem 1320, user interface 1330, and display subsystem 1332 may each be coupled with the microprocessor 1310 via one or more data/system buses 1334, 1336, 1338 (respectively).

During use of the personal media device 1112, the display panel 1230 may be configured to display e.g., the title and artist of various pieces of media content 1232, 1234, 1236 stored within the personal media device 1112. The slider assembly 1228 may be used to scroll upward or downward through the list of media content stored within the personal media device 1112. When the desired piece of media content is highlighted (e.g., "Phantom Blues" by "Taj Mahal"), the user 1114 may select the media content for rendering using the play/pause switch 1222. The user 1114 may skip forward to the next piece of media content (e.g., "Happy To Be Just . . ." by "Robert Johnson") using the forward skip switch 1220; or skip backward to the previous piece of media content (e.g., "Big New Orleans . . ." by "Leroy Brownstone") using the backward skip switch 1218. Additionally, the user 1114 may rate the media content as while listening to it by using the rating switches 1214, 1216.

As discussed above, the personal media device 1112 may include a bus interface 1340 for interfacing with e.g., the proxy computer 1154 via the docking cradle 1210. Additionally, and as discussed above, the personal media device 1112 may be wireless coupled to the network 1130 via the wireless communication channel 1150 established between the personal media device 1112 and e.g., the WAP 1152. Accordingly, the personal media device 1112 may include a wireless interface 1342 for wirelessly-coupling the personal media device 1112 to the network 1130 (or the network 1132) and/or other personal media devices. The wireless interface 1342 may be coupled to an antenna assembly 1344 for RF communication to e.g., the WAP 1152, and/or an IR (i.e., infrared) communication assembly 1346 for infrared communication with e.g., a second personal media device (such as the personal media device 1140). Further, and as discussed above, the personal media device 1112 may include a storage device 1162 for storing the instruction sets and subroutines of the device application 1160 and the DRM process 1110. Additionally, the storage device 1162 may be used to store media data files downloaded from the media distribution system 1118 and to temporarily store media data streams (or portions thereof) streamed from the media distribution system 1118.

The storage device 1162, bus interface 1340, and wireless interface 1342 may each be coupled with the microprocessor 1310 via one or more data/system buses 1348, 1350, 1352 (respectively).

As discussed above, the media distribution system 1118 distributes media content to the users 1114, 1120, 1122, 1124, 1126 such that the media content distributed may be in the form of media data streams and/or media data files. Accordingly, the media distribution system 1118 may be configured to only allow users to download media data files. For example, the user 1114 may be allowed to download, from the media distribution system 1118, media data files (i.e., examples of which may include but are not limited to MP3 files or AAC files), such that copies of the media data file are transferred from the computer 1128 to the personal media device 1112 (being stored on storage device 1162).

Alternatively, the media distribution system 1118 may be configured to only allow users to receive and process media data streams of media data files. For example, the user 1122 may be allowed to receive and process (on the client computer 1144) media data streams received from the media distribution system 1118. As discussed above, when media content is streamed from e.g., the computer 1128 to the client computer 1144, a copy of the media data file is not permanently retained on the client computer 1144.

Further, the media distribution system 1118 may be configured to allow users to receive and process media data streams and download media data files. Examples of such a media distribution system include the Rhapsody™ and Rhapsody-to-Go™ services offered by RealNetworks™ of Seattle, Wash. Accordingly, the user 1114 may be allowed to download media data files and receive and process media data streams from the media distribution system 1118. Therefore, copies of media data files may be transferred from the computer 1128 to the personal media device 1112 (i.e., the received media data files being stored on the storage device 1162); and streams of media data files may be received from the computer 1128 by the personal media device 1112 (i.e., with portions of the received stream temporarily being stored on the storage device 1162). Additionally, the user 1122 may be allowed to download media data files and receive and process media data streams from the media distribution system 1118. Therefore, copies of media data files may be transferred from the computer 1128 to the client computer 1144 (i.e., the received media data files being stored on the storage device 1148); and streams of media data files may be received from the computer 1128 by the client computer 1144 (i.e., with portions of the received streams temporarily being stored on the storage device 1148).

Typically, in order for a device to receive and process a media data stream from e.g., the computer 1128, the device must have an active connection to the computer 1128 and, therefore, the media distribution system 1118. Accordingly, the personal media device 1138 (i.e., actively connected to the computer 1128 via the wireless channel 1150), and the client computer 1144 (i.e., actively connected to the computer 1128 via a hardwired network connection) may receive and process media data streams from e.g., the computer 1128.

As discussed above, the proxy computers 1154, 1156, 1158 may function as a conduit for coupling the personal media devices 1112, 1140, 1142 (respectively) to the computer 1128 and, therefore, the media distribution system 1118. Accordingly, when the personal media devices 1112, 1140, 1142 are coupled to the proxy computers 1154, 1156, 1158 (respectively) via e.g., the docking cradle 1210, the personal media devices 1112, 1140, 1142 are actively connected to the computer 1128 and, therefore, may receive and process media data streams provided by the computer 1128.

Example User Interfaces

As discussed above, the media distribution system 1118 may be accessed using various types of client electronic devices, which include but are not limited to the personal media devices 1112, 1138, 1140, 1142, the client computer 1144, personal digital assistants (not shown), cellular telephones (not shown), televisions (not shown), cable boxes (not shown), internet radios (not shown), or dedicated network devices (not shown), for example. Typically, the type of interface used by the user (when configuring the media distribution system 1118 for a particular client electronic device) will vary depending on the type of client electronic device to which the media content is being streamed/downloaded.

For example, as the embodiment shown in FIG. 12 of the personal media device 1112 does not include a keyboard and the display panel 1230 of the personal media device 1112 is compact, the media distribution system 1118 may be configured for the personal media device 1112 via a proxy application 1170 executed on the proxy computer 1154.

The instruction sets and subroutines of the proxy application 1170, which are typically stored on a storage device (not shown) coupled to the proxy computer 1154, are executed by one or more processors (not shown) and one or more memory architectures (not shown) incorporated into the proxy computer 1154. The storage device (not shown) coupled to the proxy computer 1154 may include but is not limited to a hard disk drive, a tape drive, an optical drive, a RAID array, a random access memory (RAM), or a read-only memory (ROM).

Additionally and for similar reasons, personal digital assistants (not shown), cellular telephones (not shown), televisions (not shown), cable boxes (not shown), internet radios (not shown), and dedicated network devices (not shown) may use the proxy application 1170 executed on the proxy computer 1154 to configure the media distribution system 1118.

Further, the client electronic device need not be directly connected to the proxy computer 1154 for the media distribution system 1118 to be configured via the proxy application 1170. For example, assume that the client electronic device used to access the media distribution system 1118 is a cellular telephone. While cellular telephones are typically not physically connectable to e.g., the proxy computer 1154, the proxy computer 1154 may still be used to remotely configure the media distribution system 1118 for use with the cellular telephone. Accordingly, the configuration information (concerning the cellular telephone) that is entered via e.g., the proxy computer 1154 may be retained within the media distribution system 1118 (on the computer 1128) until the next time that the user accesses the media distribution system 1118 with the cellular telephone. At that time, the configuration information saved on the media distribution system 1118 may be downloaded to the cellular telephone.

For systems that include keyboards and larger displays (e.g., the client computer 1144), the client application 1146 may be used to configure the media distribution system 1118 for use with the client computer 1144.

Various systems and methods of categorizing media content and analyzing the quality of deep metadata associated with media content are described above. These systems and methods may be part of a music recommendation system that is implemented on one or more of a client electronic device (e.g., the personal media device 1112, the client computer 1144 and/or the proxy computer 1154) and the media distribution system 1118 (see FIG. 11), for example, as described above. The systems and methods may be implemented using one or more processes executed by the personal media device 1112, the client computer 1144, the proxy computer 1154, the server computer 1128, the DRM system 1110, and/or the media distribution system 1118, for example, in the form of software, hardware, firmware or a combination thereof. Each of these systems and methods may be implemented independently of the other systems and methods described herein. As described above, the personal media device 1112 may include a dedicated personal media device (e.g., an MP3 player), a personal digital assistant (PDA), a cellular telephone, or other portable electronic device capable of rendering digital media data.

Various modifications, changes, and variations apparent to those of skill in the art may be made in the arrangement, operation, and details of the methods and systems of the disclosure without departing from the spirit and scope of the disclosure. Thus, it is to be understood that the embodiments described above have been presented by way of example, and not limitation, and that the invention is defined by the appended claims.

What is claimed is:

1. A method for verifying the quality of metadata associated with a media data file, the method comprising:
   during a process for generating metadata associated with a media data file, verifying the quality of the metadata by:
   selecting a first attribute from the metadata associated with the media data file;
   determining an attribute dependency for the first attribute;
   determining whether the metadata includes a second attribute that satisfies the dependency;
   searching the metadata associated with the media data file for an expected attribute dimension, the attribute dimension associated with a subset of attributes;
   determining whether the expected attribute dimension includes a threshold number of defined attributes in the subset; and
   flagging the metadata associated with the media data file for reevaluation if at least one condition occurs from the group of conditions comprising:
   the dependency is not satisfied; and the expected attribute dimension does not include the threshold number of defined attributes in the subset.

2. The method of claim 1, further comprising:
selecting a third attribute from the metadata associated with the media data file;
determining whether the combination of the first attribute with the third attribute exceeds a probability threshold; and
if the combination does not exceed the probability threshold, flagging the metadata associated with the media data file for reevaluation.

3. The method of claim 1, further comprising:
determining whether a total number of attributes defined in the metadata associated with the media data file exceeds a predetermined value; and
if the total number of attributes does not exceed the predetermined value, flagging the metadata associated with the media data file for reevaluation.

4. The method of claim 1, further comprising:
if the expected attribute dimension is missing, flagging the metadata associated with the media data file for reevaluation.

5. The method of claim 1, further comprising:
searching the metadata associated with the media data file for an expected attribute; and
if the expected attribute is missing, flagging the metadata associated with the media data file for reevaluation.

6. A system for controlling the quality of metadata associated with a media data file, the system comprising:
a media content database comprising a plurality of media data files and respective metadata; and
a quality analysis component configured to verify the quality of metadata associated with the plurality of media data files in the media content database by:
selecting a set of metadata associated with a particular media data file from the media content database;
selecting a first attribute from the set of metadata;
determining an attribute dependency for the first attribute;
determining whether the set of metadata includes a second attribute that satisfies the dependency;
searching the set of metadata for an expected attribute dimension, the attribute dimension associated with a subset of attributes;
determining whether the expected attribute dimension includes a threshold number of defined attributes in the subset; and
flagging the metadata associated with the media data file for reevaluation if at least one condition occurs from the group of conditions comprising:
the dependency is not satisfied; and
the expected attribute dimension does not include the threshold number of defined attributes in the subset.

7. The system of claim 6, wherein the quality analysis component is further configured to:
select a third attribute from the set of metadata;
determine whether the combination of the first attribute with the third attribute exceeds a probability threshold; and
if the combination does not exceed the probability threshold, flag the set of metadata for reevaluation.

8. The system of claim 6, wherein the quality analysis component is further configured to:
determine whether a total number of attributes defined in the set of metadata exceeds a predetermined value; and
if the total number of attributes does not exceed the predetermined value, flag the set of metadata for reevaluation.

9. The system of claim 6, wherein the quality analysis component is further configured to:
if the expected attribute dimension is missing, flag the set of metadata for reevaluation.

10. The system of claim 6, wherein the quality analysis component is further configured to:
search the set of metadata for an expected attribute; and
if the expected attribute is missing, flag the set of metadata for reevaluation.

11. The system of claim 6, further comprising a categorization component configured to:
receive an attribute selection from a user, the received attribute selection corresponding to a new media data file;
based on the received attribute selection, determine a group of dependent attributes corresponding to the new media data file that exceed a predetermined probability threshold for the selected attribute;
display the group of dependent attributes to the user; and
allow the user to select from the group of dependent attributes.

12. The system of claim 11, wherein the categorization component is further configured to:
determine whether the received attribute selection is consistent with previously defined attributes corresponding to the new media data file; and
if the received attribute selection is inconsistent with the previously defined attributes, reject the selected attribute.

13. The system of claim 11, wherein the categorization component is further configured to:
determine that the received attribute selection corresponds to an attribute dimension that allows a single attribute to be selected from a subset of attributes;
determine that another attribute from the subset has already been selected; and
automatically assign either the received attribute selection or the other attribute from the subset based on the attribute with the highest probability of occurring within the set of metadata.

14. A method for controlling the quality of metadata associated with a media data file, the method comprising:
during a process for generating metadata associated with a media data file, controlling the quality of the metadata by:
searching the metadata associated with the media data file for an expected attribute dimension, the attribute dimension associated with a subset of attributes;
determining whether the expected attribute dimension includes a threshold number of defined attributes in the subset;
if the expected attribute dimension does not include the threshold number of defined attributes in the subset, flagging the metadata associated with the media data file for reevaluation;
receiving an attribute selection from a user, the received attribute selection corresponding to a new media data file;
based on the received attribute selection, determining a group of dependent attributes corresponding to the new media data file that exceed a predetermined probability threshold for the selected attribute;

displaying the group of dependent attributes to the user; and allowing the user to select from the group of dependent attributes.

15. The method of claim 14, further comprising:

determining whether the received attribute selection is consistent with previously defined attributes corresponding to the new media data file; and if the received attribute selection is inconsistent with the previously defined attributes, rejecting the selected attribute.

16. The method of claim 15, further comprising:

determining that the received attribute selection corresponds to an attribute dimension that allows a single attribute to be selected from a subset of attributes;

determining that another attribute from the subset has already been selected; and automatically assigning either the received attribute selection or the other attribute from the subset to the attribute dimension based on the attribute with the highest probability of occurring within the set of metadata.

* * * * *